United States Patent
Zhang et al.

(10) Patent No.: US 8,416,666 B1
(45) Date of Patent: Apr. 9, 2013

(54) SYSTEMS AND METHODS FOR LOCAL ITERATION DETERMINATION DURING DELAY PROCESSING

(75) Inventors: Fan Zhang, Milpitas, CA (US); Yang Han, Sunnyvale, CA (US); Anatoli A. Bololov, San Jose, CA (US); Mikhail I. Grinchuk, San Jose, CA (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/452,645

(22) Filed: Apr. 20, 2012

(51) Int. Cl.
*G11B 7/00* (2006.01)

(52) U.S. Cl. .............. 369/59.22; 369/59.23; 369/47.35; 360/53; 360/39

(58) Field of Classification Search .................. None
See application file for complete search history.

(56) References Cited

U.S. PATENT DOCUMENTS

| 2006/0132956 | A1* | 6/2006 | Byun et al. .................... 360/51 |
| 2008/0152318 | A1* | 6/2008 | Tatsuzawa et al. ............ 386/124 |

* cited by examiner

*Primary Examiner* — Muhammad N Edun
(74) *Attorney, Agent, or Firm* — Hamilton DeSanctis and Cha

(57) ABSTRACT

The present invention is related to systems and methods for characterizing circuit operation, and more particularly to systems and methods for modifying a data decoding process.

20 Claims, 6 Drawing Sheets

SYSTEMS AND METHODS FOR LOCAL ITERATION DETERMINATION DURING DELAY PROCESSING

BACKGROUND OF THE INVENTION

The present invention is related to systems and methods for characterizing circuit operation, and more particularly to systems and methods for modifying a data decoding process.

Data processing circuits often include a data detector circuit and a data decoder circuit. In some cases many passes are made through both the data detector circuit and the data decoder circuit in an attempt to recover originally written data. Each pass through both data detector circuit and the data decoder circuit may include a number of iterations through the data decoder circuit. The number of iterations through data decoder circuit may not yield the best result.

Hence, for at least the aforementioned reasons, there exists a need in the art for advanced systems and methods for data processing.

BRIEF SUMMARY OF THE INVENTION

The present invention is related to systems and methods for characterizing circuit operation, and more particularly to systems and methods for modifying a data decoding process.

Various embodiments of the present invention provide data processing systems that include: a data decoder circuit and a local iteration determination and limiting circuit. The data decoder circuit is operable to repeatedly apply a data decode algorithm to a decoder input during a first number of local iterations to yield corresponding decoded outputs. The local iteration determination and limiting circuit is operable to: determine a quality of each of the corresponding decoded outputs; and based at least in part on the quality of each of the corresponding decoded outputs, select a second number of local iterations. The data decoder circuit is further operable to repeatedly re-apply the data decode algorithm to the decoder input for the second number of local iterations to yield a decoder result. In some instances of the aforementioned embodiments, the data processing system is implemented as part of a storage device and a receiving device. In other instances of the aforementioned embodiments, the data processing system is implemented as part of an integrated circuit.

In various instances of the aforementioned embodiments, the quality is an indication of how many unsatisfied checks remain in the respective decoded output. In some such cases, selecting the second number of local iterations includes selecting the previously performed local iteration that yielded the smallest number of unsatisfied checks. In one or more instances of the aforementioned embodiments, the data decoder circuit is a low density parity check decoder circuit.

In some instances of the aforementioned embodiments, the data processing circuit further includes a data detector circuit operable to apply a data detection algorithm to a received input to yield a detected output. In such instances, the decoder input is derived from the detected output. In some such instances, the data detector circuit may be, but is not limited to, a maximum a posteriori data detector circuit, or a Viterbi algorithm data detector circuit. In one or more such instances, processing through both the data detector circuit and the data decoder circuit constitutes a global iteration. In such instances, determining the quality of each of the corresponding decoded outputs, selecting a second number of local iterations, and repeatedly re-applying the data decode algorithm to the decoder input for the second number of local iterations to yield the decoder result are repeatedly applied to a given data set over at least two global iterations.

Other embodiments of the present invention provide methods that include: repeatedly applying a data decode algorithm to a decoder input during a first number of local iterations by a data decoder circuit to yield corresponding decoded outputs; determining a quality of each of the corresponding decoded outputs; based at least in part on the quality of each of the corresponding decoded outputs, selecting a second number of local iterations; and repeatedly re-applying the data decode algorithm to the decoder input for the second number of local iterations to yield a decoder result. In some instances, the methods further comprise: determining that processing of a data set has completed without correcting all errors in the data set during a first processing mode; and based at least in part on determining that processing of a data set has completed without correcting all errors in the data set during the first processing mode, selecting a second processing mode and identifying the data set as a source of the decoder input.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for characterizing circuit operation, and more particularly to systems and methods for modifying a data decoding process.

Various embodiments of the present invention provide for identifying a desired number of local iterations in a data decoder of a data processing circuit, and for processing using the identified number of local iterations. In some embodiments of the present invention, the data processing circuit includes a data detector circuit and the data decoder circuit. The output of the data detector feeds the data decoder, and processing through both the data detector circuit and the data decoder circuit is referred to herein as a "global iteration". The data decoder circuit is capable or performing one or more iterations through the decoder circuit during each global iteration. Each of these iterations through the data decoder circuit is referred to herein as a "local iteration". In one particular embodiment of the present invention, a default of ten local iterations is performed during standard processing. During a delay processing period, a default of twenty local iterations is performed to identify a number of local iterations that yields the smallest number of remaining unsatisfied checks. The data set is then reprocessed through the data decoder circuit for the identified number of local iterations. As such, the local iterations through the data decoder circuit yields a decoded output with the smallest number of unsatisfied checks that are possible within the default number of local iterations.

Figure 1:
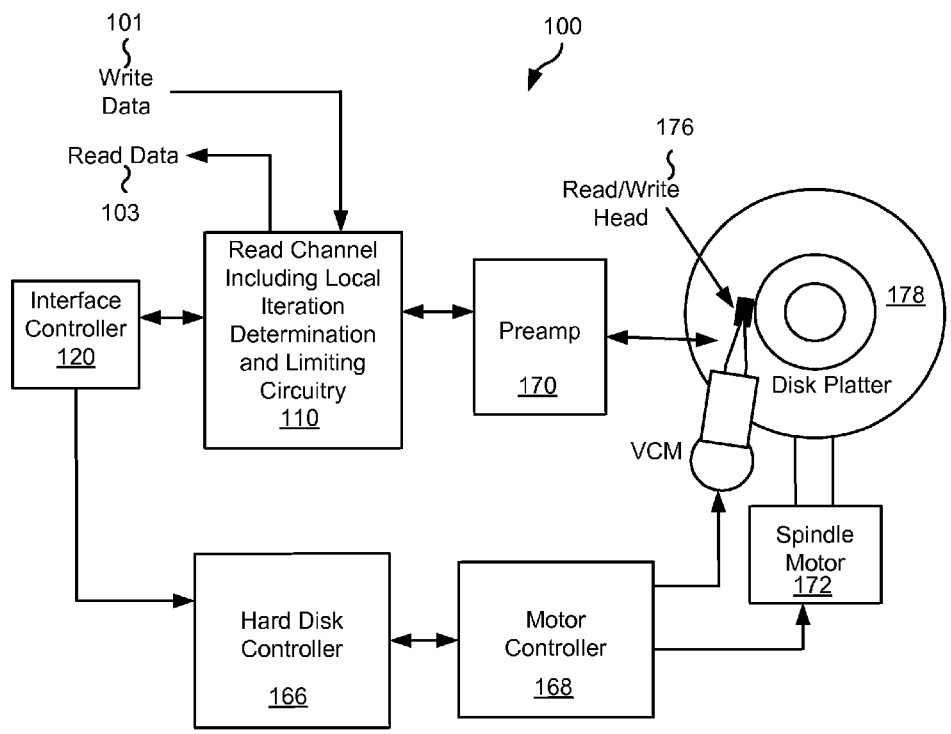
FIG. 1 shows a storage device including a read channel having local iteration determination and limiting circuitry in accordance with one or more embodiments of the present invention.

Turning to FIG. 1, a storage system 100 including a read channel circuit 110 having local iteration determination and limiting circuitry is shown in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

During operation, data is sensed from disk platter 178 and processed using a standard processing. In some cases, one or more data sets processed using standard processing fails to converge. In such a case, the non-converging data set is provided as an output with an indication that the non-converging data set is unusable, and the non-converging data set is maintained in the data processing system for additional processing during a delay processing period. This delay processing period may be, for example, a period of time when read/write head assembly 176 is moved from a current track to another track. During this delay processing period, the non-converging data set is reprocessed. The reprocessing includes performing a global iteration on the non-converged data set using a data decoder circuit included in read channel circuit 110 including, where the processing fails to result in a converged data set, a maximum number of local iterations. This maximum number of local iterations may increased from the maximum number of local iterations allowed during standard processing. For each local iteration a number of remaining unsatisfied checks is determined, and based upon this a number of local iterations that yielded the smallest number of unsatisfied checks is identified. The non-converged data set is then reprocessed through the data decoder circuit for the identified number of local iterations. As such, the local iterations through the data decoder circuit yields a decoded output with the smallest number of unsatisfied checks that are possible within the default number of local iterations. In some embodiments of the present invention, data processing circuits similar to those discussed below in relation to FIGS. 3-4 may be used, and/or the processing may be done similar to that discussed below in relation to FIGS. 5a-5c.

It should be noted that storage system 100 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

A data decoder circuit used in relation to read channel circuit 110 may be, but is not limited to, a low density parity check (LDPC) decoder circuit as are known in the art. Such low density parity check technology is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

Figure 2:
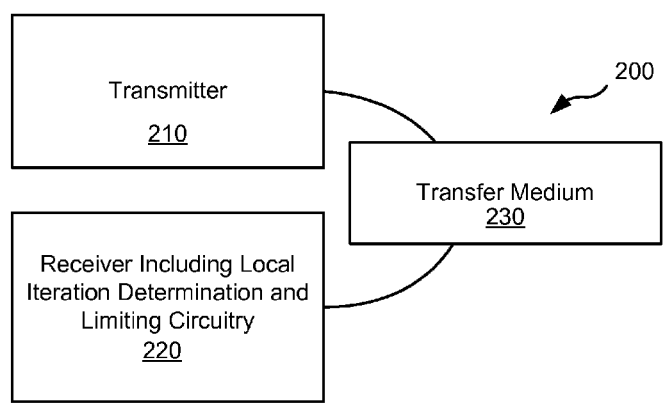
FIG. 2 shows a data transmission device including a receiver having local iteration determination and limiting circuitry in accordance with some embodiments of the present invention.

Turning to FIG. 2, a data transmission device 200 including a receiver 220 having local iteration determination and limiting circuitry is shown in accordance with some embodiments of the present invention. Data transmission system 200 includes a transmitter 210 that is operable to transmit encoded information via a transfer medium 230 as is known in the art. The encoded data is received from transfer medium 230 by receiver 220.

During operation, data is received by receiver 220 via transfer medium 230 and processed using a standard processing. In some cases, one or more data sets processed using standard processing fails to converge. In such a case, the non-converging data set is provided as an output with an indication that the non-converging data set is unusable, and the non-converging data set is maintained in the data processing system for additional processing during a delay processing period. This delay processing period may be, for example, a period of time where data is not being received via transfer medium 230. During this delay processing period, the non-converging data set is reprocessed. The reprocessing includes performing a global iteration on the non-converged data set using a data decoder circuit included in received 220 including, where the processing fails to result in a converged data set, a maximum number of local iterations. This maximum number of local iterations may increased from the maximum number of local iterations allowed during standard processing. For each local iteration a number of remaining unsatisfied checks is determined, and based upon this a number of local iterations that yielded the smallest number of unsatisfied checks is identified. The non-converged data set is then reprocessed through the data decoder circuit for the identified number of local iterations. As such, the local iterations through the data decoder circuit yields a decoded output with the smallest number of unsatisfied checks that are possible within the default number of local iterations. In some embodiments of the present invention, data processing circuits similar to those discussed below in relation to FIG. 3 or FIG. 4 may be used, and/or the processing may be done similar to that discussed below in relation to FIGS. 5a-5c.

Figure 3:
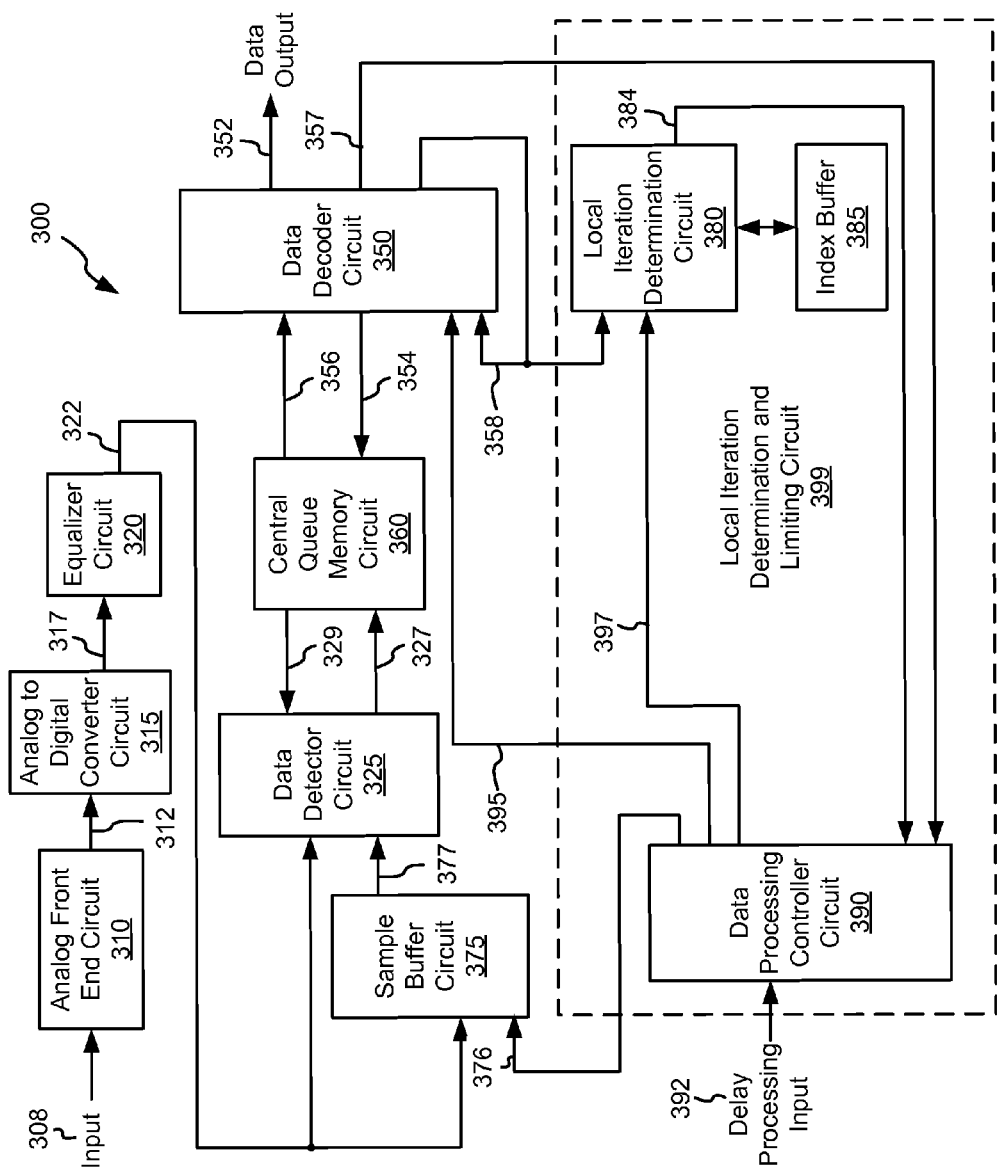
FIG. 3 depicts a data processing circuit having a local iteration determination and limiting circuit in accordance with some embodiments of the present invention.

Turning to FIG. 3, a data processing circuit 300 is shown that includes a local iteration determination and limiting circuit 399 in accordance with some embodiments of the present invention. Data processing circuit 300 includes an analog front end circuit 310 that receives an analog input 308. Analog front end circuit 310 processes analog input 308 and provides a processed analog signal 312 to an analog to digital converter circuit 315. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog input 308 is derived from a read/write head assembly (not shown) that is disposed in relation to a storage medium (not shown). In other cases, analog input 308 is derived from a receiver circuit (not shown) that is operable to receive a signal from a transmission medium (not shown). The transmission medium may be wired or wireless. Based upon the disclosure provided herein, one of ordinary skill in the art will recognize a variety of sources from which analog input 308 may be derived.

Analog to digital converter circuit 315 converts processed analog signal 312 into a corresponding series of digital samples 317. Analog to digital converter circuit 315 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 317 are provided to an equalizer circuit 320. Equalizer circuit 320 applies an equalization algorithm to digital samples 317 to yield an equalized output 322. In some embodiments of the present invention, equalizer circuit 320 is a digital finite impulse response filter circuit as are known in the art.

Equalized output 322 is provided to both a data detector circuit 325 and to a sample buffer circuit 375. Sample buffer circuit 375 stores equalized output 322 as buffered data 377 for use in subsequent iterations through data detector circuit 325. Data detector circuit 325 may be any data detector circuit known in the art that is capable of producing a detected output 327. As some examples, data detector circuit 325 may be, but is not limited to, a Viterbi algorithm detector circuit or a maximum a posteriori detector circuit as are known in the art. Of note, the general phrases "Viterbi data detection algorithm" or "Viterbi algorithm data detector circuit" are used in their broadest sense to mean any Viterbi detection algorithm or Viterbi algorithm detector circuit or variations thereof including, but not limited to, bi-direction Viterbi detection algorithm or bi-direction Viterbi algorithm detector circuit. Also, the general phrases "maximum a posteriori data detection algorithm" or "maximum a posteriori data detector circuit" are used in their broadest sense to mean any maximum a posteriori detection algorithm or detector circuit or variations thereof including, but not limited to, simplified maximum a posteriori data detection algorithm and a max-log maximum a posteriori data detection algorithm, or corresponding detector circuits. Based upon the disclosure provided herein, one of ordinary skill in the art will recognize a variety of data detector circuits that may be used in relation to different embodiments of the present invention. Detected output 325 may include both hard decisions and soft decisions. The terms "hard decisions" and "soft decisions" are used in their broadest sense. In particular, "hard decisions" are outputs indicating an expected original input value (e.g., a binary '1' or '0', or a non-binary digital value), and the "soft decisions" indicate a likelihood that corresponding hard decisions are correct. Based upon the disclosure provided herein, one of ordinary skill in the art will recognize a variety of hard decisions and soft decisions that may be used in relation to different embodiments of the present invention.

Detected output 327 is provided to a central queue memory circuit 360 that operates to buffer data passed between data detector circuit 325 and data decoder circuit 350. In some cases, data queue circuit 360 includes interleaving (i.e., data shuffling) and de-interleaving (i.e., datga un-shuffling) circuitry known in the art. When data decoder circuit 350 is available, data decoder circuit 350 receives detected output 327 from central queue memory 360 as a decoder input 356. Data decoder circuit 350 applies a data decoding algorithm to decoder input 356 output 312 in an attempt to recover originally written data. The result of the data decoding algorithm is provided as a decoded output 358. Similar to detected output 327, decoded output 358 may include both hard decisions and soft decisions. For example, data decoder circuit 350 may be any data decoder circuit known in the art that is capable of applying a decoding algorithm to a received input. Data decoder circuit 350 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 350 provides the result of the data decoding algorithm as a data output 352. Where the original data is not recovered (i.e., the data decoding algorithm failed to converge), data output 352 indicates that the data is unusable as is more specifically discussed below.

One or more iterations through the combination of data detector circuit 325 and data decoder circuit 350 may be made in an effort to converge on the originally written data set. As mentioned above, processing through both the data detector circuit and the data decoder circuit is referred to as a "global iteration". For the first global iteration, data detector circuit 325 applies the data detection algorithm to equalized output 322 without guidance from a decoded output. For subsequent global iterations, data detector circuit 325 applies the data detection algorithm to buffered data 377 as guided by decoded output 358. Decoded output 358 is received from central queue memory 360 as a detector input 329.

During each global iteration it is possible for data decoder circuit 350 to make one or more local iterations including application of the data decoding algorithm to decoder input 356. For the first local iteration, data decoder circuit 350 applies the data decoder algorithm without guidance from decoded output 358. For subsequent local iterations, data decoder circuit 350 applies the data decoding algorithm to decoder input 356 as guided by a previous decoded output 358. The number of local iterations allowed is controlled by an iteration input 395 from a data processing controller circuit 390 that is included as part of local iteration determination and limiting circuit 399. In some embodiments of the present invention, a default of ten local iterations is allowed for each global iteration during standard processing. Upon completion of each local iteration, data decoder circuit 350 increments a local iteration count 357 that indicates the number of local iterations applied by data decoder circuit 350 during a given global iteration.

Where the number of local iterations through data decoder circuit 350 exceeds that allowed by iteration input 395, but it is determined that at least one additional global iteration during standard processing of the data set is allowed, decoded output 358 is provided back to central queue memory circuit 360 as a decoded output 354. Decoded output 354 is maintained in central queue memory circuit 360 until data detector circuit 325 becomes available to perform additional processing.

Where the number of local iterations through data decoder circuit 350 exceeds that allowed by iteration input 395, it is determined whether the allowable number of global iterations has been surpassed for the data set and/or whether a timeout or memory usage calls for termination of processing of the particular data set. Where the allowable number of global iterations has been exceeded, a timeout condition has occurred, a memory usage indicates, standard processing of the data set concludes and the decoded output is provided as data output 352 with an indication that the output is unusable. In such a case, the un-converged data set is maintained in sample buffer circuit 375 for at least a defined period awaiting an indication of delay processing by assertion of a delay processing input 392. Delay processing input 392 is asserted when a downturn in the processing requirements of data processing circuit 300 occurs. Such a downturn in the processing requirements may occur, for example, because of a change in tracks when reading a storage medium or an end of transmission of a data transmission device. Based upon the disclosure provided herein, one of ordinary skill in the art will recognize a variety of scenarios that may result in under-use of data processing circuit 300.

During delay processing as indicated by assertion of delay processing input 392, one of the previously un-converged data sets remaining in sample buffer circuit 375 is accessed as indicated by a control output 376 from data processing controller circuit 390. In addition, data processing controller circuit 390 asserts a first pass indicator 397 that is provided to local iteration determination circuit 380, and changes iteration input 395 to indicate a number of local iterations of data decoder circuit 380 (i.e., a delay processing maximum). In some embodiments of the present invention, the delay processing maximum is double the number of local iterations allowed during standard processing, but may be another number.

The selected one of the previously un-converged data sets remaining in sample buffer circuit 375 is accessed as buffer data 377 and the data detection algorithm is applied thereto by data detector circuit 375. The resulting detected output 327 is received as decoder input 356 via central memory queue circuit 360 by data decoder circuit 350. Data decoder circuit 350 applies the data decoding algorithm to the received input over a number of local iterations similar to that described above. At the end of each local iteration, it is determined whether the resulting decoded output 358 converged. This process continue until either decoded output 358 converges in which case it is provided as data output 352, or the maximum number of local iterations through data decoder circuit 350 as indicated by iteration input 395 has been exceeded.

At completion of each local iteration occurring during the assertion of first pass indicator 397, decoded output 358 is provided to a local iteration determination circuit 380 that is included as part of local iteration determination and limiting circuit 399 that calculates the number of remaining unsatisfied checks at the end of the local iteration, and stores the calculated number of unsatisfied checks to an index buffer 385 in relation to the particular local iteration. At the end of the last local iteration for a given global iteration, local iteration determination circuit 380 accesses the plurality of numbers of unsatisfied checks from index buffer 385 and determines which local iteration yielded the smallest number of remaining unsatisfied checks. The number of local iterations that yielded the smallest number of remaining unsatisfied checks is reported as an iteration count 384 to data processing controller circuit 390.

Data processing controller circuit 390 changes iteration input 395 to match iteration count 384 and de-asserts first pass indicator 397. Data processing controller circuit 390 then selects the same data set pulled from sample buffer circuit 375 when first pass indicator 397 was asserted for re-processing, and causes data processing circuit 300 to perform another global iteration on the data set with the number of local iterations through data decoder circuit 350 limited to the number indicated by the updated value of iteration input 395 (i.e., local iteration maximum).

This double pass through data decoder circuit 350 is repeated for each global iteration during the delay processing and assures that the number of local iterations yielding the smallest number of unsatisfied checks is used for each global iteration. The first pass processing the data set identifies the best number of local iterations, and the second pass processes the data set using the determined number of local iterations. Such a process improves the possibility of convergence for a given data set where the number of unsatisfied checks increases where more local iterations are applied.

It should be noted that local iteration determination and limiting circuitry in accordance with different embodiments of the present invention may be applied to a variety of different data processing circuits. For example, such local iteration adjustment circuitry may be applied to data processing circuits such as those described in U.S. patent application Ser. No. 12/114,462 entitled "Systems and Methods for Queue Based Data Detection and Decoding" and filed May 2, 2008 by Yang et al. The entirety of the aforementioned reference is incorporated herein by reference for all purposes. As another example, such power monitoring and/or power governance may be applied to data processing circuits such as those described in U.S. patent application Ser. No. 12/785,416 entitled "Systems and Methods for Variable Data Processing Using a Central Queue" and filed May 21, 2010 by Gunnam et al. The entirety of the aforementioned reference is incorporated herein by reference for all purposes. Based upon the disclosure provided herein, one of ordinary skill in the art will recognize a variety of other data processing circuits that may be used in relation to different embodiments of the present invention.

Figure 4:
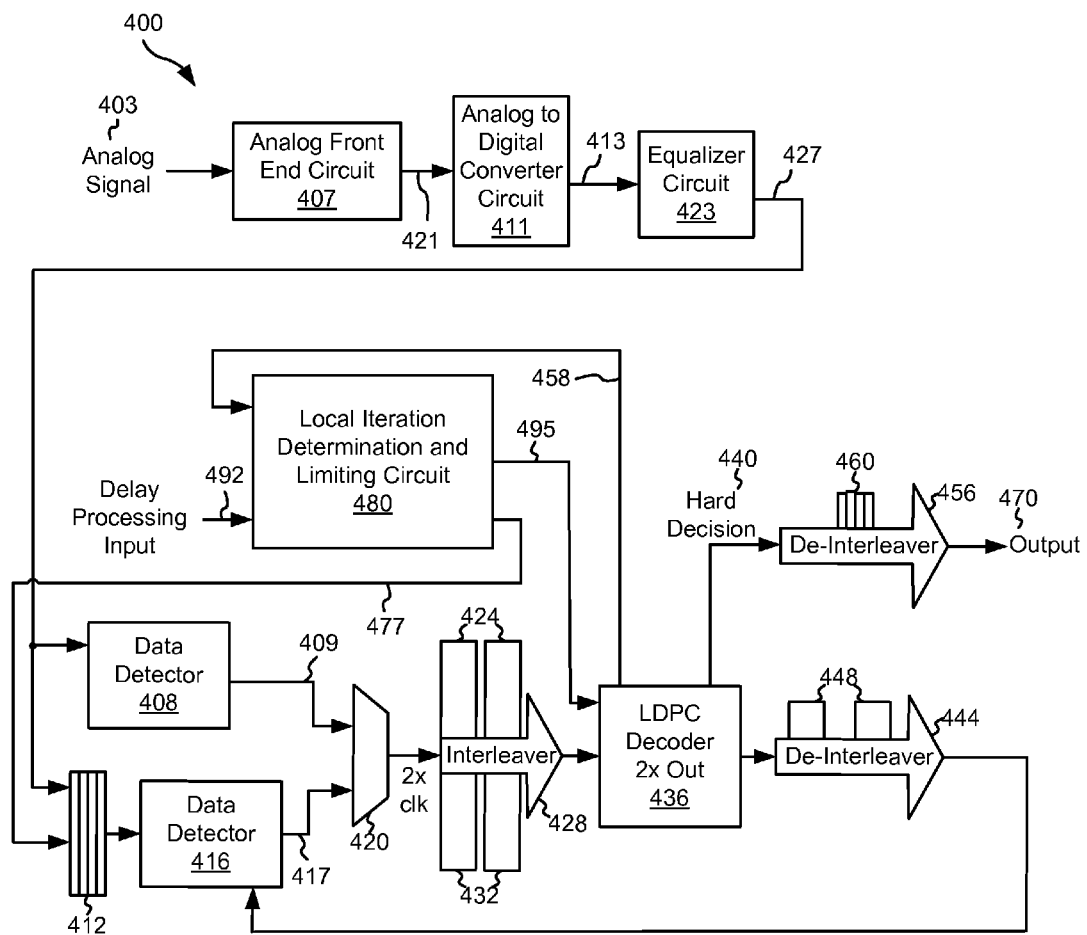
FIG. 4 depicts another data processing circuit having a local iteration determination and limiting circuit in accordance with some embodiments of the present invention.

Turning to FIG. 4, another data processing circuit 400 is shown that includes a local iteration determination and limiting circuit 480 in accordance with some embodiments of the present invention. Data processing circuit 400 includes an analog front end circuit 407 that receives an analog signal 403. Analog front end circuit 407 processes analog signal 403 and provides a processed analog signal 421 to an analog to digital converter circuit 411. Analog front end circuit 407 may include, but is not limited to, an analog filter and an amplifier circuit as are known in the art. Based upon the disclosure provided herein, one of ordinary skill in the art will recognize a variety of circuitry that may be included as part of analog front end circuit 407. In some cases, analog signal 403 is derived from a read/write head assembly (not shown) that is disposed in relation to a storage medium (not shown). In other cases, analog signal 403 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 403 may be derived.

Analog to digital converter circuit 411 converts processed analog signal 421 into a corresponding series of digital samples 413. Analog to digital converter circuit 411 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 413 are provided to an equalizer circuit 423. Equalizer circuit 423 applies an equalization algorithm to digital samples 413 to yield an equalized output 427. In some embodiments of the present invention, equalizer circuit 423 is a digital finite impulse response filter circuit as are known in the art.

Equalized output 427 is provided to both a data detector circuit 408 and to an input data buffer 412. Input data buffer 412 stores equalized output 427 as buffered data for use in subsequent iterations through another data detector circuit 416. Data detector circuit 408 may be any type of data detector circuit known in the art including, but not limited to, a soft output Viterbi algorithm detector or a maximum a posteriori detector. Based on the disclosure provided herein, one of ordinary skill in the art will recognize a variety of data detector circuits that may be used in accordance with different embodiments of the present invention. Input data buffer 412 that is designed to hold a number of data sets received from as equalized output 427. The size of input data buffer 412 may be selected to provide sufficient buffering such that a data set input via equalized output 427 remains available at least until a first iteration processing of that same data set is complete and the processed data is available in a ping pong buffer 448 (i.e., a queuing buffer) as more fully described below. Input data buffer 412 provides the data sets to data detector circuit 416. Similar to data detector circuit 408, data detector circuit 416 may be any type of data detector circuit known in the art including, but not limited to, a Viterbi algorithm detector or a MAP detector. Again, based on the disclosure provided herein, one of ordinary skill in the art will recognize a variety of data detector circuits that may be used in accordance with different embodiments of the present invention.

An output 409 from data detector circuit 408 and an output 417 from data detector circuit 416 are provided to an interleaver circuit 428 via a multiplexer 420. Such outputs may be, for example, log likelihood ratio values. Interleaver circuit 420 interleaves the output of data detector circuit 408 and separately interleaves the output of data detector circuit 416 using two ping pong buffers 424, 432. One of the buffers in ping pong buffer 424 holds the result of a prior interleaving process of the output from data detector circuit 408 and is unloaded to a low density parity check (LDPC) decoder 436, while the other buffer of ping pong buffer 424 holds a data set from data detector circuit 408 that is currently being interleaved (i.e., shuffled). Similarly, one of the buffers in ping pong buffer 432 holds the result of a prior interleaving process of the output from data detector circuit 416 and is unloaded to LDPC decoder 436, while the other buffer of ping pong buffer 424 holds a data set from data detector circuit 416 that is currently being interleaved.

LDPC decoder 436 is capable of decoding one or more data sets simultaneously. As an example, LDPC decoder 436 may be designed to decode an interleaved data set from ping pong buffer 424, or an interleaved data set from ping pong buffer 432, or to decode interleaved data sets from ping pong buffer 424 and ping pong buffer 432 simultaneously. The decoded data is either provided as a hard decision output 440 and/or to a de-interleaver circuit 444 that uses ping pong buffer 448 to de-interleave the decoded data and to provide the de-interleaved data as an input to data detector circuit 416. One of the buffers in ping pong buffer 448 holds the result of a prior de-interleaving process and is unloaded to data detector circuit 416, while the other buffer of ping pong buffer 448 holds a decoded data set currently being de-interleaved. Hard decision output 440 is provided to a de-interleaver circuit 456 that de-interleaves hard decision output 440 and stores the de-interleaved result in an output data buffer 460. Ultimately, de-interleaver circuit 456 provides the de-interleaved data stored in output data buffer 460 as an output 470.

In operation, a first data set is introduced via data input 404 to data detector circuit 408. Data detector circuit 408 performs its channel detection algorithm and provides both a hard output and a soft output to multiplexer 420. The hard and soft decision data is written to one buffer of ping pong buffer 424. At the same time the detector output is written into the buffer, interleaver 428 interleaves the data set by writing consecutive data into non-consecutive memory/buffer addresses based on the interleaver algorithm/mapping. Once interleaver 424 completes its interleaving process, the interleaved data is decoded by LDPC decoder 436. Where the data converges, LDPC decoder 436 writes its output as hard decision output 440 to output data buffer 460 and the processing is completed for that particular data set. Alternatively, where the data does not converge, LDPC decoder 436 writes its output (both soft and hard) to ping pong buffer 448. As more fully described below, the scheduling guarantees that there is at least one empty buffer for holding this new set of data, and this strategy assures that each data input is guaranteed the possibility of at least two global iterations (i.e., two passes through a detector and decoder pair).

The data written to ping pong buffer 448 is fed back to data detector circuit 416. Data detector circuit 416 selects the data set that corresponds to the output in ping pong buffer 448 from input data buffer 412 and performs a subsequent data detection aided by the soft output data generated by LDPC decoder 436 fed back from ping pong buffer 448. By using the previously generated soft data for data maintained in input data buffer 412, data detector circuit 416 generally performs a subsequent channel detection with heightened accuracy. The output of this subsequent channel detection is passed to interleaver 428 via multiplexer 420. The data is written to one buffer of ping pong buffer 432, and interleaver 428 interleaves the data. The interleaved data is then passed to LDPC decoder 436 where it is decoded a second time. Similar to the first iteration, a decision is made as to whether the data converged or whether there is insufficient space in ping pong buffer 448 to handle the data. Where such is the case, LDPC decoder 436 writes its output as hard decision output 440 to output data buffer 460 and the processing is complete for that particular data set. Alternatively, where the data does not converge and there is sufficient buffer space in ping pong buffer 448 to receive an additional data set, writes its output (both soft and hard) to ping pong buffer 448 where it is passed back to data detector circuit 416 for a third pass. Sufficient space is defined in ping pong buffer 448 by having at least reserved space for the data set from the first detector and decoder after the data set from the second detector and decoder is written into the ping pong buffer.

It should be noted that, as an example, a first data set may be applied at data input 404 and that it takes a number of iterations to converge while all subsequent data sets applied at data input 404 converge on the first pass (i.e., on a single global iteration). In such a case, the first data set may be processed a number of times (i.e., a number of global iterations) that is limited by the amount of memory available in output data buffer 460. Once output data buffer 460 is full or once an ordered set of outputs are available, the most recent hard decision output corresponding to the first data set is provided as a hard decision output and de-interleaver 456 re-orders the outputs putting the first output in the first position. With this done, output data buffer 460 are flushed out as output 470. In some embodiments of the present invention, de-interleaver 456 does not perform a re-ordering function and output data buffer 460 has a very limited size. In such a case, it is conceivable that a data set could be processed a very large number times (i.e., a large number of global iterations) only limited by how long a recipient of output 470 is willing to wait for the data. As another example, it is possible that all data applied as equalized output 427 converges on its first pass. In such a case, data detector circuit 416, LDPC decoder 436 and/or de-interleaver 444 may be placed in a power saving mode to conserve power. As yet another example, it may be the case that all data sets applied as equalized output 427 fail to converge on the first pass (i.e., a single global iteration). In such a case, all data sets would be iterated twice. It should also be noted that one or more additional data detector circuits may be added along with additional space in ping pong buffers 424, 432, 448 that would facilitate more iterations in the situation where a significant number of closely located data sets fail to converge. In such cases, all data sets can be guaranteed to be decoded with number of iterations the same as the number of detectors.

During each global iteration it is possible for data decoder circuit 436 to make one or more local iterations including re-application of the data decoding algorithm to a given data set using the previously data decoding result as a guide. For the first local iteration, data decoder circuit 436 applies the data decoder algorithm without guidance from a previous decoded output. For subsequent local iterations, data decoder circuit 436 applies the data decoding algorithm to a detected output received from one of ping pong buffers 424, 432 as guided by a previous decoded output. The number of local iterations allowed is controlled by local iteration determination and limiting circuit 480. In some embodiments of the present invention, a default of ten local iterations is allowed for each global iteration. This default number of local iterations is controlled by an iteration input 495 from local iteration determination and limiting circuit 480. During standard processing, the number of local iterations indicated by iteration input 495 is the default number. In contrast, during a delay processing period indicated by assertion of a delay processing input 492, local iteration determination and limiting circuit 480 is operable to modify the number of local iterations. In one particular embodiment of the present invention, local iteration determination and limiting circuit 480 is implemented similar to local iteration determination and limiting circuit 399 described above in relation to FIG. 3.

Where the number of local iterations through data decoder circuit 436 exceeds that allowed by iteration input 495, it is determined whether the allowable number of global iterations has been surpassed for the data set and/or whether a timeout or memory usage calls for termination of processing of the particular data set. Where the allowable number of global iterations has been exceeded, a timeout condition has occurred, a memory usage indicates, standard processing of the data set concludes and the decoded output is provided as data output 470 with an indication that the output is unusable. In such a case, the un-converged data set is maintained in input data buffer 412 for at least a defined period awaiting an indication of delay processing by assertion of a delay processing input 492. Delay processing input 492 is asserted when a downturn in the processing requirements of data processing circuit 400 occurs. Such a downturn in the processing requirements may occur, for example, because of a change in tracks when reading a storage medium or an end of transmission of a data transmission device. Based upon the disclosure provided herein, one of ordinary skill in the art will recognize a variety of scenarios that may result in under-use of data processing circuit 400.

During delay processing as indicated by assertion of delay processing input 492, one of the previously un-converged data sets remaining in input buffer 412 is accessed as indicated by a control output 477 from local iteration determination and limiting circuit 480. In addition, local iteration determination and limiting circuit 480 changes iteration input 495 to indicate a number of local iterations of data decoder circuit 436 (i.e., a delay processing maximum). In some embodiments of the present invention, the delay processing maximum is double the number of local iterations allowed during standard processing, but may be another number.

The selected one of the previously un-converged data sets remaining in input buffer 412 is accessed and the data detection algorithm is applied thereto by data detector circuit 416. The resulting detected output 417 is received as a decoder input via interleaver circuit 428 by data decoder circuit 436. Data decoder circuit 436 applies the data decoding algorithm to the received input over a number of local iterations similar to that described above. At the end of each local iteration, it is determined whether a resulting decoded output from data decoder circuit 436 converged. This process continues until either the decoded output from data decoder circuit 436 converges in which case it is provided as a hard decision output 440, or the maximum number of local iterations through data decoder circuit 436 as indicated by iteration input 495 has been exceeded.

At completion of each local iteration occurring during a first pass through up to the maximum number of local iterations of data decoder circuit 436, a resulting decoded output 458 from data decoder circuit 436 is provided to local iteration determination and limiting circuit 480 that calculates the number of remaining unsatisfied checks at the end of the local iteration, and stores the calculated number of unsatisfied checks to an index buffer in relation to the particular local iteration. At the end of the last local iteration for a given global iteration, local iteration determination and limiting circuit 480 accesses the plurality of numbers of unsatisfied checks from the index buffer and determines which local iteration yielded the smallest number of remaining unsatisfied checks. The number of local iterations that yielded the smallest number of remaining unsatisfied checks is used as the value provided as iteration input 495 to data decoder circuit 436.

Local iteration determination and limiting circuit 480 then selects the same data set pulled from input buffer 412 for the earlier global iteration, and causes data processing circuit 400 to perform another global iteration on the data set with the number of local iterations through data decoder circuit 436 limited to the number indicated by the updated value of iteration input 495 (i.e., local iteration maximum).

This double pass through data decoder circuit 436 is repeated for each global iteration during the delay processing and assures that the number of local iterations yielding the smallest number of unsatisfied checks is used for each global iteration. The first pass processing the data set identifies the best number of local iterations, and the second pass processes the data set using the determined number of local iterations. Such a process improves the possibility of convergence for a given data set where the number of unsatisfied checks increases where more local iterations are applied.

Again, it should be noted that local iteration determination and limiting circuitry in accordance with different embodiments of the present invention may be applied to a variety of different data processing circuits. For example, such local iteration adjustment circuitry may be applied to data processing circuits such as those described in U.S. patent application Ser. No. 12/114,462 entitled "Systems and Methods for Queue Based Data Detection and Decoding" and filed May 2, 2008 by Yang et al. The entirety of the aforementioned reference was previously incorporated herein by reference for all purposes. As another example, such power monitoring and/or power governance may be applied to data processing circuits such as those described in U.S. patent application Ser. No. 12/785,416 entitled "Systems and Methods for Variable Data Processing Using a Central Queue" and filed May 21, 2010 by Gunnam et al. The entirety of the aforementioned reference was previously incorporated herein by reference for all purposes. Based upon the disclosure provided herein, one of ordinary skill in the art will recognize a variety of other data processing circuits that may be used in relation to different embodiments of the present invention.

Figure 5A:
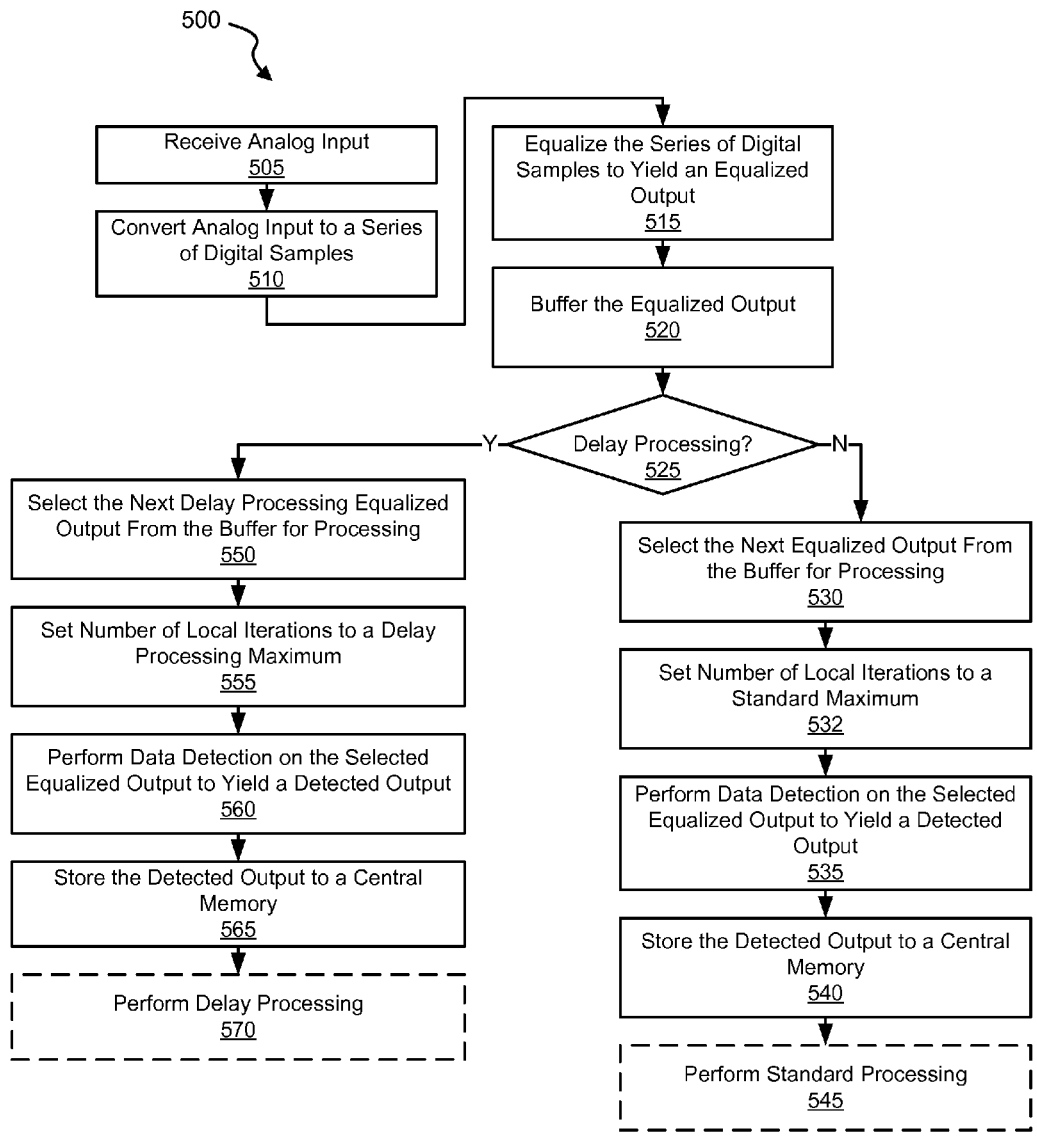
FIGS. 5a-5c are flow diagrams showing a method in accordance with some embodiments of the present invention for determining and limiting the number of local data decode iterations performed during data processing.
Figure 5B:
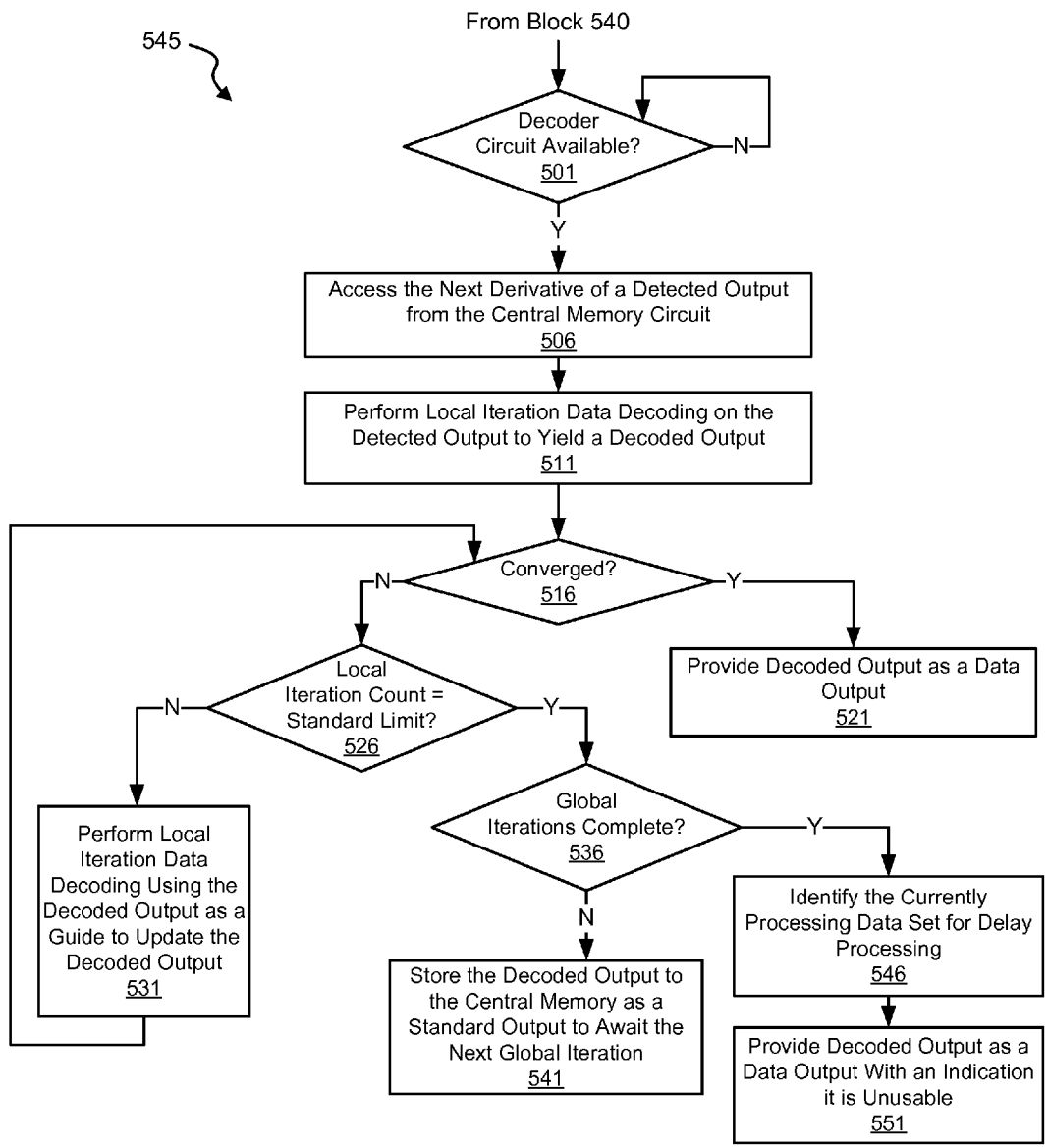
Figure 5C:
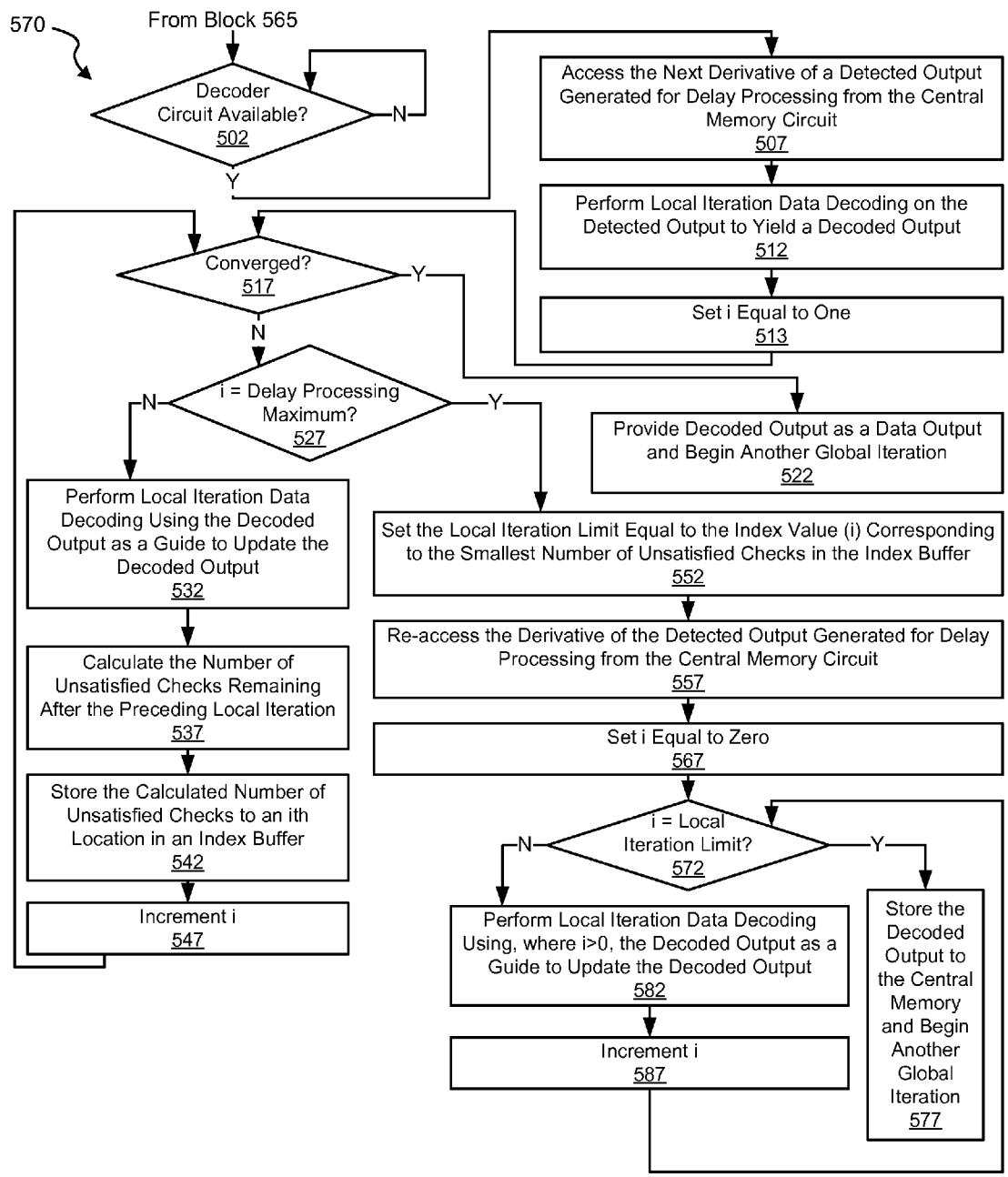

Turning to FIGS. 5a-5c, flow diagrams 500, 545, 570 show a method in accordance with some embodiments of the present invention for determining and limiting the number of local data decode iterations performed during data processing. Turning to FIG. 5a and following flow diagram 500, an analog input is received (block 505). The analog input may be derived from, for example, a storage medium or a data transmission channel. Based upon the disclosure provided herein, one of ordinary skill in the art will recognize a variety of sources of the analog input. The analog input is converted to a series of digital samples (block 510). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (Y[k]) (block 515). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention. The equalized output is buffered (block 520).

It is determined whether delay processing is desired (block 525). Such delay processing is selected when a downturn in the processing requirements of a data processing circuit occurs. Such a downturn in the processing requirements may occur, for example, because of a change in tracks when reading a storage medium or an end of transmission of a data transmission device. Based upon the disclosure provided herein, one of ordinary skill in the art will recognize a variety of scenarios that may result in under-use of the data processing circuit.

Where delay processing is not desired (block 525), standard processing is applied. This standard processing includes selecting the next equalized output from the buffer for processing (block 530). This selection may be done in accordance with any data processing circuit selection algorithm known in the art. In addition, the number of allowed local iterations is set to a standard maximum (block 532). This standard maximum may be, for example, ten local iterations. A data detection algorithm is applied to the selected equalized output to yield a detected output (block 535), and the detected output (or a derivative thereof) is stored to a central memory circuit (block 540). This stored data may then be accessed from the central memory for performance of standard processing (flow diagram 545). This standard processing is done in accordance with flow diagram 545 of FIG. 5b.

Where delay processing is desired (block 525), delay processing is applied. This delay processing includes selecting the next delay processing equalized output from the buffer for processing (block 550). The delay processing equalized output is selected from one or more data sets that failed to converge during standard processing. In addition, the number of allowed local iterations is set to a delay processing maximum (block 555). This delay processing maximum may be, for example, twenty local iterations. The data detection algorithm is applied to the selected delay processing equalized output to yield a detected output (block 560), and the detected output (or a derivative thereof) is stored to a central memory circuit (block 565). This stored data may then be accessed from the central memory for performance of delay processing (flow diagram 570). This delay processing is done in accordance with flow diagram 570 of FIG. 5c.

Turning to FIG. 5b, flow diagram 545 shows an implementation of the aforementioned standard processing. Following flow diagram 545, it is determined whether a decoder circuit is available to process a previously stored detected output (block 501). Where the decoder circuit is available (block 501), the next derivative of a detected output is selected for processing and accessed from the central memory circuit (block 506). A first local iteration of a data decoding algorithm is applied by the data decoder circuit to the selected detected output to yield a decoded output (block 511).

It is then determined whether the decoded output converged (i.e., yielded a correct result) (block 516). Where the decoded output converged (block 516), the decoded output is provided as a data output (block 521). Alternatively, where the decoded output failed to converge (block 516), it is determined whether the local iteration count has exceeded a standard limit (block 526). This standard limit may be, for example, ten local iterations. Where the number of local iterations has not yet been exceeded (block 526), the data decoding algorithm is re-applied to the currently processing data set for a subsequent local iteration guided by the decoded output to yield an updated decoded output (block 531). The processes beginning at block 516 are then repeated.

Alternatively, where the number of local iterations for the currently proceeding global iteration have been exceeded (block 526), it is determined if the maximum number of global iterations have already been applied to the currently processing data set (block 536). The number of global iterations may be complete where, for example, a timeout condition has occurred or a memory usage limitation has been exceeded. Where the global iterations are not complete (block 536), the decoded output is stored to the central memory as a standard output where it awaits processing in a subsequent global iteration (block 541). Alternatively, where the global iterations are complete (block 536), the currently processing data set is identified for delay processing (i.e., processing during a delay processing period) (block 546), and the decoded output is provided as a data output marked as unusable (block 551).

Turning to FIG. 5c, flow diagram 570 shows an implementation of the aforementioned delay processing. Following flow diagram 570, it is determined whether a decoder circuit is available to process a previously stored detected output (block 502). Where the decoder circuit is available (block 502), the next derivative of a detected output generated for delay processing (i.e., identified for delay processing in block 546) is selected for processing and accessed from the central memory circuit (block 507). A first local iteration of a data decoding algorithm is applied by the data decoder circuit to the selected detected output to yield a decoded output (block 512) and an index counter (i) is set equal to one (block 513).

It is then determined whether the decoded output converged (block 517). Where the decoded output converged (block 517), the decoded output is provided as a data output (block 522). Alternatively, where the decoded output failed to converge (block 517), it is determined whether the local iteration count has exceeded a delay processing maximum (block 527). This delay processing maximum may be, for example, double that of the standard limit. Where the number of local iterations has not yet been exceeded (block 527), the data decoding algorithm is re-applied to the currently processing data set for a subsequent local iteration guided by the decoded output to yield an updated decoded output (block 532). In addition, a number of unsatisfied checks remaining at the end of the preceding application of the data decode algorithm is calculated (block 537), and stored to an $i^{th}$ location in an index buffer (block 542). The index value i is then incremented in preparation for the next local iteration (block 547), and the processes beginning at block 517 delay processing maximum are then repeated until either a decoded output converges (block 517) or all of the allowed local iterations have completed (block 527). Where no convergence occurs, the index buffer will include a number of unsatisfied checks that were remaining at the end of each of the local iterations.

Where all of the allowed local iterations have completed (block 527), the number of allowable local iterations is changed from the delay processing maximum to the number of local iterations that resulted in the fewest number of unsatisfied checks as indicated by the data stored in the index buffer (block 552). The derivative of the detected output originally accessed in block 507 is re-accessed (block 557) and the index i is set equal to zero (block 567). It is determined whether the local iteration count has exceeded the local iteration limit set in block 552 (block 572). Where the number of local iterations has not yet been exceeded (block 572), the data decoding algorithm is re-applied to the currently processing data set for a subsequent local iteration guided by the decoded output to yield an updated decoded output (block 582), and the index value i is then incremented in preparation for the next local iteration (block 587), and the processes beginning at block 572 are then repeated for the next local iteration. Alternatively, where the number of local iterations has been exceeded (block 572), the resulting decoded output is stored to the central memory in preparation for the beginning of another global iteration (block 577).

This double pass through application of the data decode algorithm by the data decoder circuit is repeated for each global iteration during the delay processing and assures that the number of local iterations yielding the smallest number of unsatisfied checks is used for each global iteration. The first pass processing the data set identifies the best number of local iterations, and the second pass processes the data set using the determined number of local iterations. Such a process improves the possibility of convergence for a given data set where the number of unsatisfied checks increases where more local iterations are applied.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
  a data decoder circuit operable to repeatedly apply a data decode algorithm to a decoder input during a first number of local iterations to yield corresponding decoded outputs; and
  a local iteration determination and limiting circuit operable to:

determine a quality of each of the corresponding decoded outputs;

based at least in part on the quality of each of the corresponding decoded outputs, select a second number of local iterations; and wherein the data decoder circuit is further operable to repeatedly re-apply the data decode algorithm to the decoder input for the second number of local iterations to yield a decoder result.

2. The data processing system of claim 1, wherein the quality is an indication of how many unsatisfied checks remain in the respective decoded output.

3. The data processing system of claim 2, wherein selecting the second number of local iterations includes selecting the previously performed local iteration that yielded the smallest number of unsatisfied checks.

4. The data processing system of claim 1, wherein the data decoder circuit is a low density parity check decoder circuit.

5. The data processing system of claim 1, wherein the data processing circuit further comprises:

a data detector circuit operable to apply a data detection algorithm to a received input to yield a detected output, wherein the decoder input is derived from the detected output.

6. The data processing system of claim 5, wherein the data detector circuit is selected from a group consisting of: a maximum a posteriori data detector circuit, and a Viterbi algorithm data detector circuit.

7. The data processing system of claim 5, wherein processing through both the data detector circuit and the data decoder circuit constitutes a global iteration, and wherein the processes of: determining the quality of each of the corresponding decoded outputs, selecting a second number of local iterations, and repeatedly re-applying the data decode algorithm to the decoder input for the second number of local iterations to yield the decoder result are repeatedly applied to a given data set over at least two global iterations.

8. The data processing system of claim 5, wherein the data processing system further comprises:

an equalizer circuit operable to receive a series of digital samples and to equalize the series of digital samples to yield the received input.

9. The data processing system of claim 8, wherein the data processing system further comprises:

an analog to digital converter circuit operable to convert an analog input into the series of digital samples.

10. The data processing system of claim 1, wherein the data processing system is implemented as part of a device selected from a group consisting of: a storage device and a receiving device.

11. The data processing system of claim 1, wherein the data processing system is implemented as part of an integrated circuit.

12. A method, the method comprising:

repeatedly applying a data decode algorithm to a decoder input during a first number of local iterations by a data decoder circuit to yield corresponding decoded outputs;

determining a quality of each of the corresponding decoded outputs;

based at least in part on the quality of each of the corresponding decoded outputs, selecting a second number of local iterations; and repeatedly re-applying the data decode algorithm to the decoder input for the second number of local iterations to yield a decoder result.

13. The method of claim 12, the method further comprising:

determining that processing of a data set has completed without correcting all errors in the data set during a first processing mode; and based at least in part on determining that processing of a data set has completed without correcting all errors in the data set during the first processing mode, selecting a second processing mode and identifying the data set as a source of the decoder input.

14. The method of claim 12, wherein the quality is an indication of how many unsatisfied checks remain in the respective decoded output.

15. The method of claim 14, wherein selecting the second number of local iterations includes selecting the previously performed local iteration that yielded the smallest number of unsatisfied checks.

16. The method of claim 12, wherein the data decode algorithm is a low density parity check decoder algorithm.

17. The method of claim 12, wherein the method further comprises:

applying a data detection algorithm to a received input to yield a detected output, wherein the decoder input is derived from the detected output.

18. The method of claim 17, wherein application of the data detection algorithm and the data decode algorithm constitutes a global iteration; and wherein determining the quality of each of the corresponding decoded outputs, selecting a second number of local iterations, and repeatedly re-applying the data decode algorithm to the decoder input for the second number of local iterations to yield the decoder result are repeatedly applied to a given data set over at least two global iterations.

19. A storage device, the storage device comprising:

a storage medium;

a head assembly disposed in relation to the storage medium and operable to provide a sensed signal corresponding to information on the storage medium;

a read channel circuit including:

an analog front end circuit operable to provide an analog signal corresponding to the sensed signal;

an analog to digital converter circuit operable to sample the analog signal to yield a series of digital samples;

an equalizer circuit operable to equalize the digital samples to yield a received input;

a data detector circuit operable to apply a data detection algorithm to the received input to yield a decoder input;

a data decoder circuit operable to repeatedly apply a data decode algorithm to a decoder input during a first number of local iterations to yield corresponding decoded outputs; and a local iteration determination and limiting circuit operable to:

determine a quality of each of the corresponding decoded outputs;

based at least in part on the quality of each of the corresponding decoded outputs, select a second number of local iterations; and wherein the data decoder circuit is further operable to repeatedly re-apply the data decode algorithm to the decoder input for the second number of local iterations to yield a decoder result.

20. The storage device of claim 19, wherein the quality is an indication of how many unsatisfied checks remain in the respective decoded output.

* * * * *